(12) United States Patent  (10) Patent No.: US 8,402,381 B2
Berg et al.  (45) Date of Patent: Mar. 19, 2013

(54) AUTOMATICALLY ARRANGING WIDGETS OF A MODEL WITHIN A CANVAS USING ITERATIVE REGION BASED WIDGET RELATIVE ADJUSTMENTS

(75) Inventors: Daniel C. Berg, Holly Springs, NC (US); Brad L. Blancett, Raleigh, NC (US); Michael D. Elder, Durham, NC (US); Chad M. Holliday, Holly Springs, NC (US); Narinder Makin, Morrisville, NC (US); John E. Swanke, Terryville, CT (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 12/236,069

(22) Filed: Sep. 23, 2008

(65) Prior Publication Data

US 2010/0077328 A1 Mar. 25, 2010

(51) Int. Cl.
G06F 2006/01 (2006.01)
(52) U.S. Cl. .......................... 715/764; 382/162; 715/799
(58) Field of Classification Search .................. 715/764, 715/801, 788, 517; 395/342; 717/139; 713/310; 382/162; 707/100
See application file for complete search history.

(56) References Cited

U.S. PATENT DOCUMENTS

| | | | |
|---|---|---|---|
| 5,689,665 A * | 11/1997 | Mitsui et al. .................. | 715/803 |
| 5,712,995 A * | 1/1998 | Cohn ............................ | 715/792 |
| 5,796,401 A * | 8/1998 | Winer ........................... | 345/619 |
| 5,970,490 A | 10/1999 | Morgenstern | |
| 6,192,516 B1 * | 2/2001 | Griesemer .................... | 717/139 |
| 6,256,773 B1 | 7/2001 | Bowman-Amuah | |
| 6,629,065 B1 | 9/2003 | Gadh et al. | |
| 6,701,514 B1 | 3/2004 | Haswell et al. | |
| 6,789,054 B1 | 9/2004 | Makhlouf | |
| 6,795,089 B2 | 9/2004 | Rajarajan et al. | |
| 6,826,727 B1 * | 11/2004 | Mohr et al. ................... | 715/235 |
| 7,050,872 B2 | 5/2006 | Matheson | |
| 7,069,541 B2 | 6/2006 | Dougherty et al. | |
| 7,069,553 B2 | 6/2006 | Narayanaswamy et al. | |
| 7,134,122 B1 | 11/2006 | Sero et al. | |
| 7,196,712 B2 | 3/2007 | Rajarajan et al. | |
| 7,320,120 B2 | 1/2008 | Rajarajan et al. | |
| 7,370,315 B1 | 5/2008 | Lovell et al. | |
| 7,463,263 B2 | 12/2008 | Gilboa | |
| 7,568,019 B1 | 7/2009 | Bhargava et al. | |

(Continued)

OTHER PUBLICATIONS

Arnold, W., et al., "Pattern Based SOA Deployment," Proc. of 5th Int'l. Conf. on Service-Oriented Computing (ICSOC 2007), Sep. 17-20, 2007, Lecture Notes in Computer Science (LNCS), vol. 4749, Springer 2007.

(Continued)

*Primary Examiner* — Matt Kim
*Assistant Examiner* — Tuan S Nguyen
(74) *Attorney, Agent, or Firm* — Patents on Demand P.A.; Brian K. Buchheit; Scott M. Garrett (57) ABSTRACT

A widget adjustment event can be detected for a widget that is part of a model that is presented on a canvas of a user interface. On-canvas objects proximate to the widget can be adjusted. The on-canvas objects can include other widgets. The adjustments can be performed relative to a layout position of the widget after the widget adjustment event has occurred. Additional on-canvas objects further from the widget can the adjusted on-canvas objects can then be adjusted as necessary due to new positions of the adjusted on-canvas objects.

17 Claims, 4 Drawing Sheets

U.S. PATENT DOCUMENTS

| | | | |
|---|---|---|---|
| 7,630,877 B2 | 12/2009 | Brown et al. | |
| 7,643,597 B2 | 1/2010 | Liu et al. | |
| 7,665,085 B2 | 2/2010 | Sundararajan et al. | |
| 7,669,137 B2 | 2/2010 | Chafe et al. | |
| 7,735,062 B2 | 6/2010 | de Seabra e Melo et al. | |
| 2003/0011639 A1* | 1/2003 | Webb | 345/808 |
| 2003/0163450 A1 | 8/2003 | Borenstein et al. | |
| 2004/0179011 A1 | 9/2004 | Marshall | |
| 2004/0268269 A1* | 12/2004 | Breinberg | 715/851 |
| 2005/0125742 A1* | 6/2005 | Grotjohn et al. | 715/799 |
| 2006/0004794 A1* | 1/2006 | Pizzo et al. | 707/100 |
| 2006/0066627 A1 | 3/2006 | Gerhard et al. | |
| 2006/0101091 A1 | 5/2006 | Carbajales et al. | |
| 2006/0101445 A1 | 5/2006 | Carbajales et al. | |
| 2006/0198555 A1* | 9/2006 | Hosotsubo | 382/162 |
| 2006/0271909 A1 | 11/2006 | Huang et al. | |
| 2007/0074203 A1 | 3/2007 | Curtis et al. | |
| 2007/0179823 A1 | 8/2007 | Bhaskaran et al. | |
| 2007/0277151 A1 | 11/2007 | Brunel et al. | |
| 2007/0288885 A1 | 12/2007 | Brunel et al. | |
| 2008/0059877 A1* | 3/2008 | Brookler et al. | 715/264 |
| 2008/0127049 A1 | 5/2008 | Elaasar | |
| 2008/0183725 A1 | 7/2008 | Blakeley et al. | |
| 2008/0256439 A1* | 10/2008 | Boreham et al. | 715/246 |
| 2008/0313008 A1 | 12/2008 | Lee et al. | |
| 2008/0313595 A1 | 12/2008 | Boulineau et al. | |
| 2008/0313596 A1 | 12/2008 | Kreamer et al. | |
| 2009/0007062 A1 | 1/2009 | Gilboa | |
| 2009/0012842 A1 | 1/2009 | Srinivasan et al. | |
| 2009/0044170 A1 | 2/2009 | Bernardi et al. | |
| 2009/0077621 A1 | 3/2009 | Lang et al. | |
| 2009/0132562 A1 | 5/2009 | Mehr et al. | |
| 2009/0171993 A1 | 7/2009 | Arthursson | |
| 2009/0249281 A1 | 10/2009 | Fritzsche et al. | |
| 2009/0278847 A1 | 11/2009 | Berg et al. | |
| 2009/0319239 A1 | 12/2009 | Arnold et al. | |
| 2009/0319467 A1 | 12/2009 | Berg et al. | |
| 2010/0011316 A1* | 1/2010 | Sar et al. | 715/784 |
| 2010/0030893 A1 | 2/2010 | Berg et al. | |
| 2010/0031247 A1 | 2/2010 | Berg et al. | |
| 2010/0058331 A1 | 3/2010 | Berg et al. | |
| 2010/0077328 A1 | 3/2010 | Arnold et al. | |
| 2010/0083212 A1 | 4/2010 | Fritzsche et al. | |

OTHER PUBLICATIONS

Eilam, T., et al., "Reducing the Complexity of Application Deployment in Large Data Centers," Proc. of 9th IFIP/IEEE Int'l Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory,1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

* cited by examiner

FIG. 1

```
Pseudo Code 250

Create a list called siblingWidgets of all widgets in the canvas and their current positions
Create an empty map called toBeMovedMap that will contain each widget to be moved and its
new position                                                                              255
For each siblingWidgets
  If it overlaps the new size of the expanded container and doesn't intersect the ignore area
      Determine how far the widget needs to move horizontal/vertical in order not to overlap
      Keep track of the largest change in position (as largestDelta) any widget in the list needs
          to move
  End if
End for                                                                                   260
If largestDelta is zero, there is no overlap, so return                       265
Create an empty moveMap
Create a list called affectedAreaList and add the new container rectangle to it
For each siblingWidgets
  If it intersects with a rectangle in affectedAreaList and if it's in the target area and if it isn't
      in the ignore area
      Add the widget to the moveMap <widget, Rectangle>
End if
End for                                                                                   270
For each entry in moveMap                                                     275
  Determine a new position for the widget based on the delta calculated above
  Add the widget and its new position to the toBeMovedMap
  Add the widget's new rectangle to the affectedAreaList
  Remove the widget from the siblingWidgets list so that it can't be moved again
End for
Continue until moveMap is empty (or no widgets are moved in an iteration) — 280
Return the toBeMovedMap so that the widgets in the map can be moved — 285
```

FIG. 2

```
Pseudo Code 350
Create a list called siblingWidgets of all widgets in the canvas and their current positions
Create an empty map called toBeMovedMap that will contain each widget to be moved and its new
    position
Create a list called toBeMovedSiblingMap that will contain sibling widgets that should be moved
Calculate the change in size of the collapsed widget (delta)
Calculate a widgetTargetArea, which is the canvas region to be checked for affected widgets
Create an empty list called foundWidgets                                                    355
For each siblingWidgets ——— 360
  If the widget doesn't intersect the target area, continue to the next widget
  Create a new widgetTargetArea which begins at the same position as the widget, but with an
  infinite width or height depending on whether the contraction algorithm is moving widgets
  horizontally or vertically
  Add the widget to foundWidgets since it will be moved                                     365
  Call findNextClosestIntersectRect which will iterate through all siblingWidgets and find the
  widget that is closest to the right/below this widget
  Only test widgets that intersect widgetTargetArea and ignore any widgets in foundWidgets list
  (have already been moved)
  If a proximate widget is found, add the widget to the foundWidgets list                   370
  If it is within a predefined distance to this widget and if this widget isn't already in the
  toBeMovedMap (already being moved)
       Calculate a new position for the proximate widget by subtracting the delta from it's x or y
       Call isIntectingSibilings () which loops through the toBeMovedSiblingMap to see if the new
  position for the proximate widget will cause it to overlap another widget-- if so the move can be
  ignored
       Add the new position for the proximate widget to the toBeMovedMap map
       Increase the size of the original target area to include this proximate widget plus a spacer
  End if                                                                                    375
   Loop until findNextClosestIntersectRect finds no proximate widgets or all proximate widgets have
been processed ——— 380
End for each widget ——— 385
Return the toBeMovedMap ——— 390
```

AUTOMATICALLY ARRANGING WIDGETS OF A MODEL WITHIN A CANVAS USING ITERATIVE REGION BASED WIDGET RELATIVE ADJUSTMENTS

BACKGROUND

The present invention relates to the field of user interfaces, more particularly to automatically arranging widgets of a model within a canvas using iterative region based widget relative adjustments.

Graphical diagrams can be useful for many things, such as conveying a set of information or planning out the placement of a set of objects. Graphical diagrams can be created using graphical editor computer applications. These applications can allow a user to create a model, which can be a collection of discrete graphically render-able objects called widgets. The presentation of these widgets on the canvas can be a graphical diagram. Graphical editors can display a canvas, which can be a visible portion of a model displayed in the graphical editor. Different view modes can be applied and effect the display of the model and the widgets it contains. Relationships or connections can exist between widgets. Depending on the semantic content of the model being displayed, different relationships can exist between widgets.

Changes in the widgets of a model can have a negative effect on the overall layout of the model and can cause layout inconsistencies. These changes can include the expanding or collapsing of widgets, resizing widgets, adding widgets to a crowded layout, and the like. A common example of a layout inconsistency can be overlapping widgets. Current graphical editors attempt to remedy this by containing a rudimentary auto-arrangement option that uses a "snap-to-grid," where the layout is divided into a grid and each widget automatically snaps to each point, or node, in the grid. A significant amount of effort is often required to make an automatically adjusted model presented on a canvas presentable using this technique. When widgets are altered in the graphic editor (i.e. collapsed/expanded, resized, added), it can result in layout inconsistencies, and therefore a completely new set of manual adjustment requirements. A solution is required to reduce the manual effort required to maintain a presentable canvas when widgets are automatically arranged.

DETAILED DESCRIPTION

An embodiment of the present invention presents an auto-adjustment technique for a graphical editor that identifies a layout inconsistency involving a widget, which adjusts a canvas space proximate to that widget, and then iteratively adjusts spaces affected by the original adjustment. The present invention can be triggered by widget adjustments. These widget adjustments can cause layout inconsistencies, which can include, but are not limited to, overlapping, uneven spacing, incompatible widget relationships, and the like. Overlapping can occur when the render-able portion of widgets occupies some or all of the same space. When a widget adjustment event is encountered, the present invention can trigger an adjustment algorithm associated with the adjustment event. This adjustment algorithm can determine if the adjustment has created a layout inconsistency and remedy it. The adjustment algorithm can remedy the inconsistency by calculating new positions for each widget affected by the inconsistency. As new positions are calculated, they can be iteratively processed to determine if the change affects other widgets.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
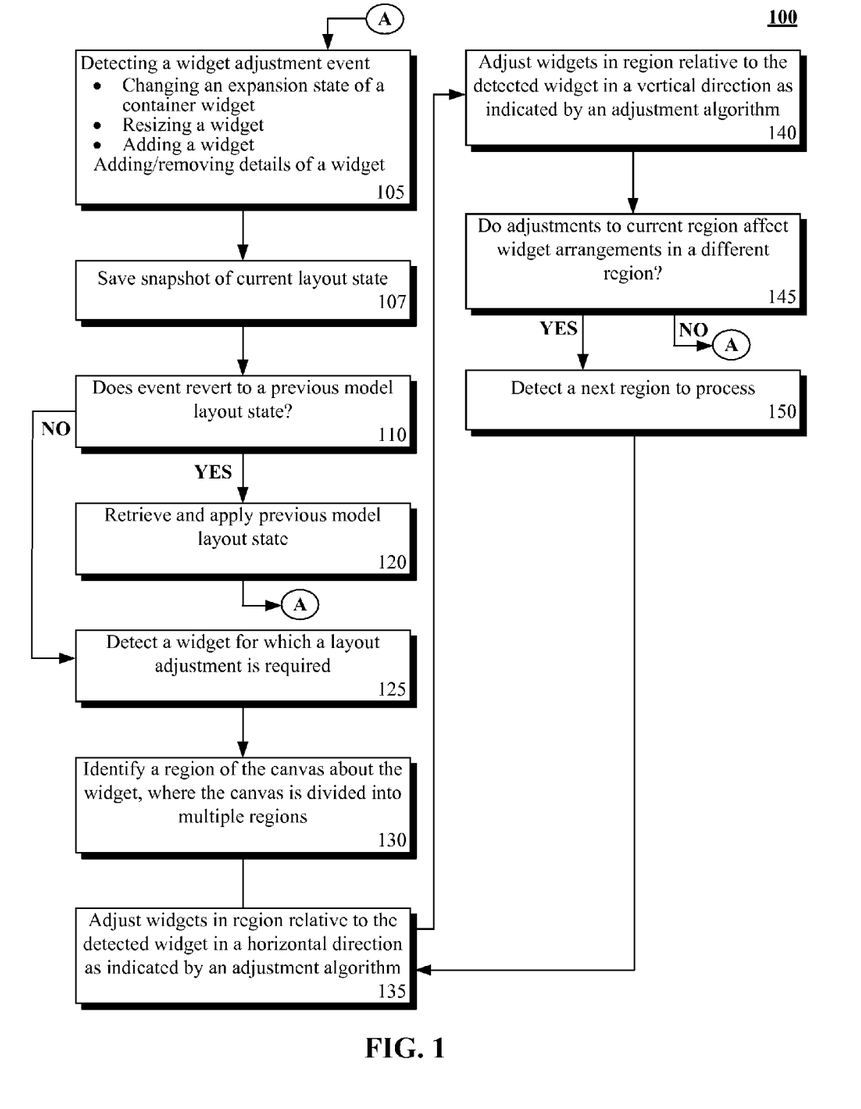
FIG. 1 is a flow chart of a method for automatically arranging widgets of a model within a canvas using iterative region based widget relative adjustments in accordance with an embodiment of the inventive arrangements disclosed herein.

FIG. 1 is a flow chart of a method 100 for automatically arranging widgets of a model within a canvas using iterative region based widget relative adjustments in accordance with an embodiment of the inventive arrangements disclosed herein. Method 100 can begin in step 105, where a widget adjustment event can be detected. Such widget adjustment events can include changing the expansion state of a container widget, resizing a widget, adding a widget, and adding or removing details of a widget.

In step 107, a snapshot of the current layout state can be saved. In one embodiment, the layout state can be maintained in a layout table. In the layout table, the "values" stored can be layout states of a canvas upon which widgets of a model are displayed and the "keys" can be a combination of widgets that were expanded and/or collapsed on the given canvas. Assuming a common model (i.e., no model changes), a number of combinations of widgets being expanded/contracted and other visual elements being shown/hidden can be saved for a single model table. The layout table can store one or more snapshots (canvas layouts) for one-or-more models at a time. In one embodiment, the layout table can be used in an analogous fashion to a "clipboard memory" except it is specifically purposed for layout states. Further, a layout table is not restricted to temporally reverting to different ordered and previously occurring actions (e.g., it is not restricted to a LIFO stack). Instead, the layout table can be used to retrieve any stored layout state from any initial layout state.

In step 110, it can be determined if the adjustment event reverts the model to a previous layout state. If in step 110, the event reverts to a previous model layout state, method 100 can continue to step 120, where the previous model layout state can be retrieved and applied. After step 120 completes, method 100 can complete or return to step 105 to detect additional widget adjustment events.

As an example of reverting to a previous model layout state, assume that A, B, and C are Widgets and that "e" and "c" represent an expanded and collapsed state for each widget. A given layout state for a model consisting of Widgets A, B, and C can have a "key" of AeBcCc, which signifies that Widget A is expanded, and Widgets B and C are collapsed. Assume layout states are restricted to expanded and collapsed and that only three widgets are included in a model, a layout state table as described above having a complete set of stored layout states can include two to the third power or eight entries for keys: AeBeCe, AeBeCc, AeBcEe, AeBcCc, AcBeCe, AcBeCc, AcBcEe, and AcBcCc.

Of course, should a widget adjustment event (105) move or delete a widget on a canvas, the layout state table needs to be adjusted accordingly. Either of these events can cause a layout state table to be purged and/or pruned. For example, if Widget C was deleted, either the layout state table can be purged or all references to Widget C can be removed. Thus, the eight states shown above for Widgets A-C can either be pruned to four states (AeBe, AeBc, AcBe, AcBc) should Widget C be deleted, in which case the layout state snapshots can be edited to remove an object corresponding to Widget C. Similar problems exist when an object is moved, since the snapshot layouts will all change. An alternative approach to purging a layout state table responsive to a moved widget is to adjust each snapshot entry to account for the movement. Additionally, when widgets are added (or other model changes made) then a layout state table also needs to either be purged or some adjustment made to account for any layout changes that result when the new widget it added. In one embodiment, a canvas can be broken up into a set of multiple regions, where different layout state table entries correspond to regions instead of to an entire canvas. This can permit region snapshots to be re-used, assuming that layout changes in one region do not affect other regions of a canvas.

Regardless of implementation details used for implementing a layout state table, if in step 110, the adjustment event does not revert to a previous model layout state, method 100 can continue to step 125. A previous layout state may not be found for two reasons. First, a software application implementation of method 100 may not persist the layout state table, so when the user exits the program and restarts, the state table will be empty. Second, a particular collapse/expand condition might not have occurred before.

In step 125, the widget for which a layout adjustment is required can be detected. This widget can be the widget in which was subject to adjustment in step 105. In step 130, a region of the canvas about the widget can be identified. The canvas can be divided into a one or more regions. Regions can be of any shape. For example, regions can be rectangular. In another example, regions can include a set of concentric circles centered on the widget subject to the adjustment. In various embodiments, regions can overlap one another and can be of varying sizes. Any discrete area of a canvas able to be adjusted for layout purposes can be considered a region.

In step 135, widgets that appear in the region detected in step 130 can be adjusted in a horizontal direction as indicated by an adjustment algorithm. In step 140, these widgets can be adjusted in a vertical direction as indicated by an adjustment algorithm. In step 145, it can be determined if the adjustments made affect widgets in a different region. If in step 145, other widgets are not affected, method 100 can complete or return to step 105 to respond to additional widget adjustment events. If in step 145, other widgets have been affected by the adjustments, method 100 can continue to step 150, where an additional region to process can be determined. This region can include the area or areas in which the additional widgets detected in step 145 occupy. After step 150, method 100 can return to step 135, where adjustments can be made to the widgets in the detected region in a horizontal direction as indicated by an adjustment algorithm.

Although method 100 describes a canvas as a two dimensional space in which a model (e.g., 2D model) is rendered, the disclosure is not so limited and any N-dimensional space can be handled. For example, the canvas can be a 3D space within which 3D models are rendered. Additional adjustments for each axis of the N-dimensional space can be added after step 140 and before step 145. Further, the adjustments (steps 135 and 140) need not be implemented as discrete actions/steps as shown, but can be concurrently adjusted (e.g., via linear algebra transformation operations).

Figure 2:
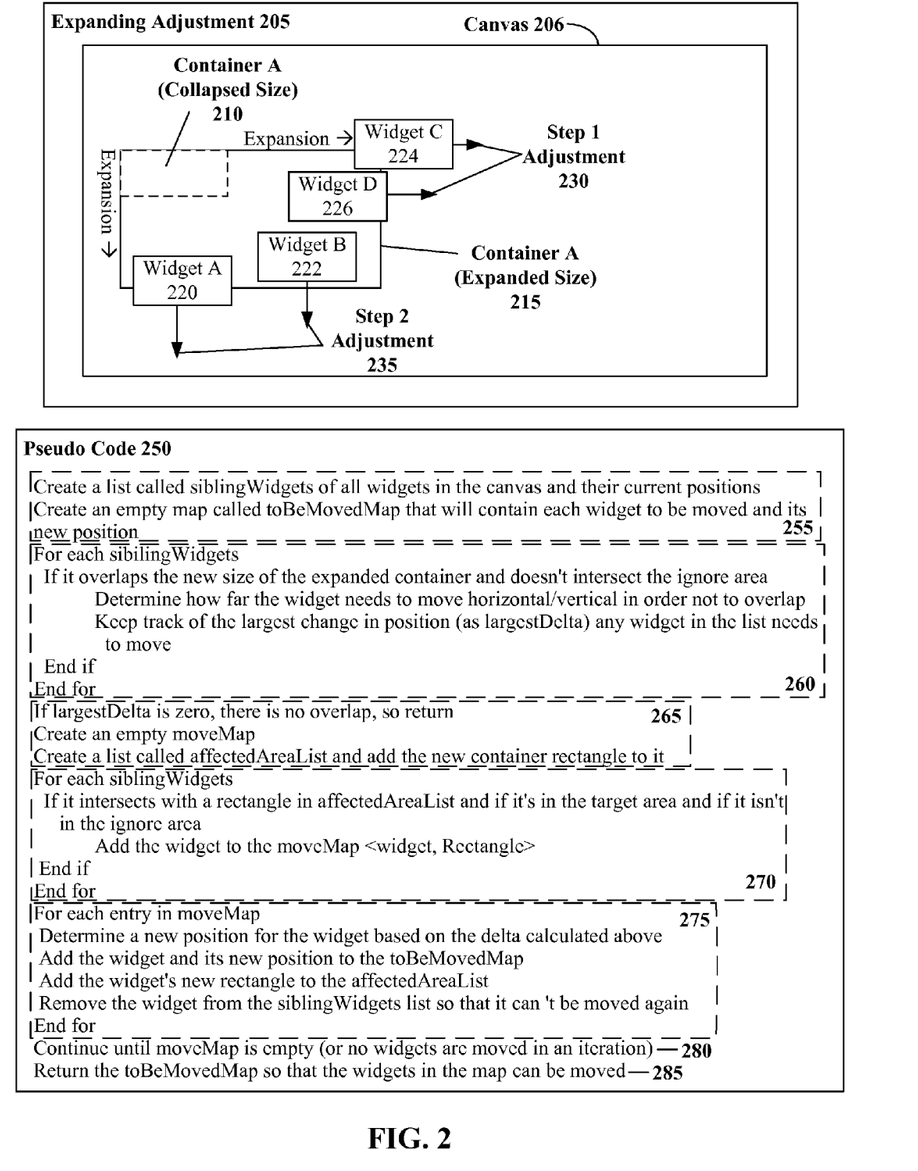
FIG. 2 illustrates a region adjustment caused by expanding a widget within a canvas in accordance with an embodiment of the inventive arrangements disclosed herein.

FIG. 2 illustrates a region adjustment 205 caused by expanding a widget within a canvas in accordance with an embodiment of the inventive arrangements disclosed herein.

The expanding adjustment 205 illustrates an expanding of container widget 210. Container widget 210 can illustrate the container in a collapsed state and container widget 215 can illustrate the same widget after it has been adjusted to an expanded state. When container widget 210 is expanded, an adjustment event can occur which can trigger the automatic re-arrangement of widgets 220-226. Container widget 210 can overlap widgets 220-226 when it expands, creating a layout inconsistency. The automatic re-arrangement of widgets 220-226 can work to remedy the layout inconsistency. Step 1 adjustment 230 can illustrate the widgets 224 and 226 being moved to the right to remedy the inconsistency. Step 2 adjustment 235 can illustrate the widgets 220 and 222 being moved downwards. Although these directions are shown, it is contemplated that widgets 2220-226 can be moved in either horizontal or either vertical directions, or a combination of both.

Pseudo code 250 illustrates sample pseudo code to execute when an expanding adjustment event occurs. Pseudo code 250 can detect whether a widget expansion event has created a layout inconsistency. If so, pseudo code 250 can remedy the inconsistency or inconsistencies.

Pseudo code 250 can begin with lines 255, which can initialize lists siblingWidgets and toBeMovedMap. The siblingWidgets list can be populated with all of the widgets on the canvas and their current positions. When created, the toBeMovedMap list can be empty, and can later contain each widget to be moved and its new position. Lines 260 illustrate a for loop that iterates through each widget stored in siblingWidgets list. For each iteration, it first checks to see if the widget overlaps the new size of the expanded container and the widget does not intersect the ignore area. The ignore area can be an area to detect during a future iteration and therefore should be ignored now. For example, if the code is first to move a widget to the right, then up. During the first iteration, the ignore area would include above the widget and only to the right of the widget would be tested. If the widget does not overlap the new size of the expanded container or does intersect the ignore area, the loop can continue to the next widget. If the widget overlaps the new size of the expanded container and does not intersect the ignore area, how far the widget needs to move horizontally or vertically in order to not overlap is detected. The largest change in position is tracked as largestDelta.

In lines 265 of pseudo code 250, the tracked largestDelta can be checked to see if it is zero. If it is, pseudo code 250 can discontinue execution because no widgets need to be removed. Now that it is determined that widgets need to be moved, next additional initialization steps can be completed for determining new positions for the widgets. First, an empty list called moveMap can be created to contain moved widgets and rectangle they intersect with. Next, a list can be created called affectedAreaList and a rectangle can be added to it that is the same size of the newly expanded container widget. affectedAreaList can contain a list of rectangles to check for further layout inconsistencies that are caused by the automatic widget re-arrangement. Lines 270 of pseudo code 250 illustrate a loop which iterates through each widget stored in siblingWidgets. For each sibling widget, they are tested to see if they intersect any rectangle in affectedAreaList and if they are in the target area and not the ignore area. If the widget meets the criteria, it is added to the moveMap list with the rectangle in which it intersects from affectedAreaList.

Lines 275 of pseudo code 250 illustrate a loop in which iterates through each entry in moveMap. For each entry in moveMap, a new position for the widget based on the change in position calculated in lines 260 can be determined. Then the widget and its new position can be added to the toBeMovedMap list. Then the widget's new rectangle can be added to the affectedAreaList. Finally, the widget can be removed from the siblingWidgets list so it cannot be moved again. Line 280 of pseudo code 250 can cause the code illustrated in pseudo code 250 to loop until the moveMap generated is empty (therefore no widgets are moved in the iteration). Line 285 can illustrate that the toBeMovedMap list can be returned from this pseudo code to external code that performs the moving of the widgets.

Figure 3:
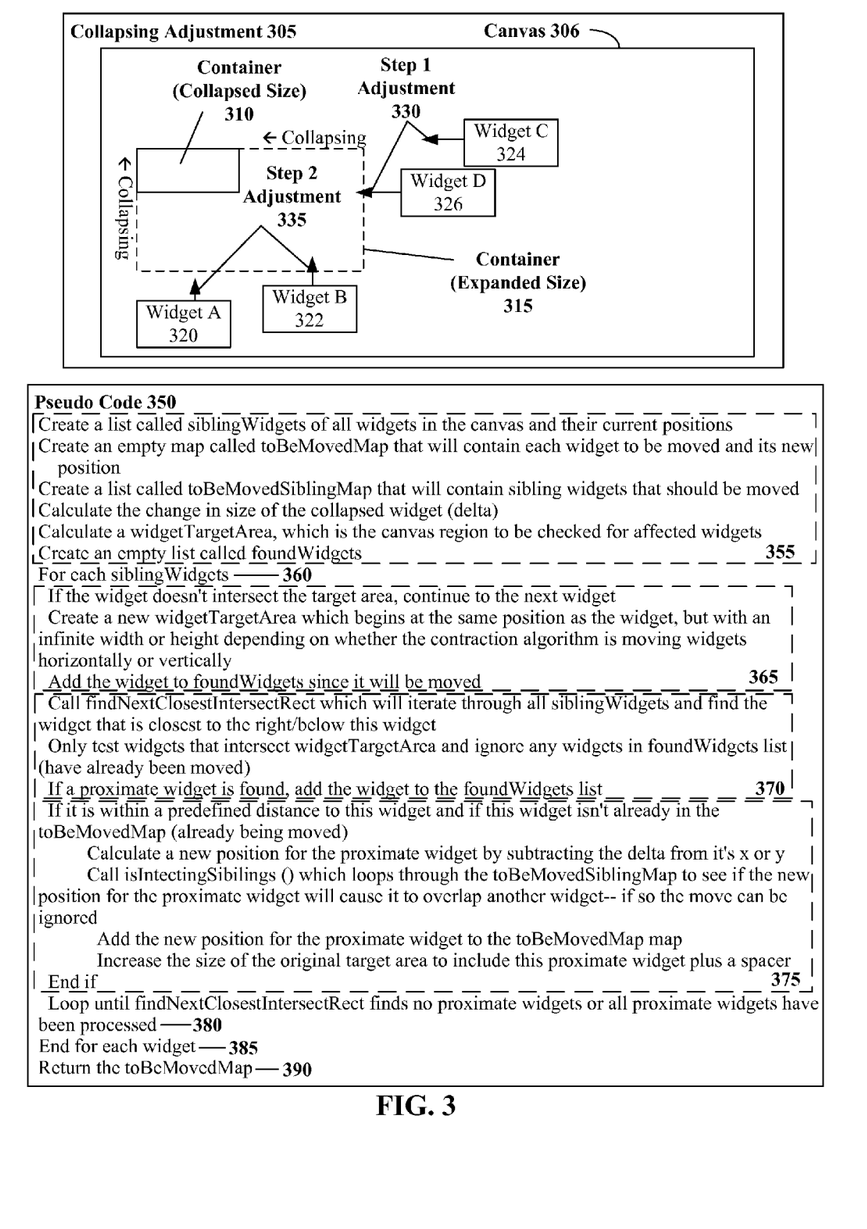
FIG. 3 illustrates a region adjustment caused by collapsing a widget within a canvas in accordance with an embodiment of the inventive arrangements disclosed herein.

FIG. 3 illustrates a region adjustment 305 caused by collapsing a widget within a canvas in accordance with an embodiment of the inventive arrangements disclosed herein.

The collapsing adjustment 305 illustrates a collapsing of container widget 315. Container widget 315 can illustrate the container widget in an expanded state and container widget 310 can illustrate the same container widget after it has been collapsed. When container widget 310 is collapsed, an adjustment event can occur which can trigger the automatic re-arrangement of widgets 320-326 to remedy the layout inconsistency caused by the collapsing of container widget 310. Step 1 adjustment 330 can illustrate widgets 324 and 326 being moved to the left. Step 2 adjustment 335 can illustrated widgets 320 and 322 being moved upwards.

Pseudo code 350 illustrates sample pseudo code to execute when a collapsing adjustment event occurs. Pseudo code 350 can detect if the widget collapsing event caused a layout inconsistency and if so, pseudo code 350 can remedy the inconsistency or inconsistencies.

Pseudo code 350 can begin with lines 355, which can perform initialization steps. In lines 355, first a list called siblingWidgets can be created, which can contain all of the widgets in the canvas and their current positions. Next, an empty map called toBeMovedMap can be created that can later contain each widget to be moved and its new position. Next, a list called toBeMovedSiblingMap can be created that can contain sibling widgets that should be moved. Next, the change in size (delta) of the collapsed widget can be calculated. Next, a widgetTargetArea can be calculated, which can be the canvas region to be checked for affected widgets.

Finally, an empty list called foundWidgets can be created. Line 360 can begin a loop that iterates through each widget in the siblingWidgets list.

In lines 365, the widget can be tested to see if it intersects with the target area. If it does not intersect, the loop can skip to the next widget. If the widget does intersect, a new widgetTargetArea can be created which can begin at the same position as the widget, but can have an infinite width or height, depending on whether the contraction algorithm is moving widgets horizontally or vertically respectively. Next, the widget is added to the foundWidgets list since it will be moved in this iteration.

In lines 370, first the function or subroutine findNextClosestIntersectRect can be called, which can iterate through all siblingWidgets and find the widget that is closest to this widget in the direction for this iteration (i.e. up, down, left, right). These widgets are only tested for intersection with widgetTargetArea and widgets in the foundWidgets list are ignored. If a proximate widget is found by the function call, it can be added to the foundWidgets list.

In lines 375, first the widget can be tested to see if it is within a predefined distance to the widget and if this widget is not already added to the toBeMovedMap. If these criteria are not met, the widget is not processed further in lines 375. If these criteria are met, a new position for the proximate widget can be calculated by subtracting the delta from its x or y position. Next, the function isIntersectSiblings can be called, which can loop through the toBeMovedSiblingMap to see if the new position for the proximate widget will cause it to overlap with another widget. If this is the case, the move can be ignored. If not, the proximate widget and its new position can be added to the toBeMovedMap. Finally in lines 375, the size of widgetTargetArea can be increased to include this proximate widget plus a spacer.

Line 380 can illustrate that the code can loop until findNextClosestIntersectRect no longer finds proximate widgets, therefore all proximate widgets have been processed. Line 385 can illustrate the end of the for loop which began in line 360. Line 390 can illustrate that the toBeMovedMap will be returned to external code, which can handle moving all of the widgets to their new positions.

Figure 4:
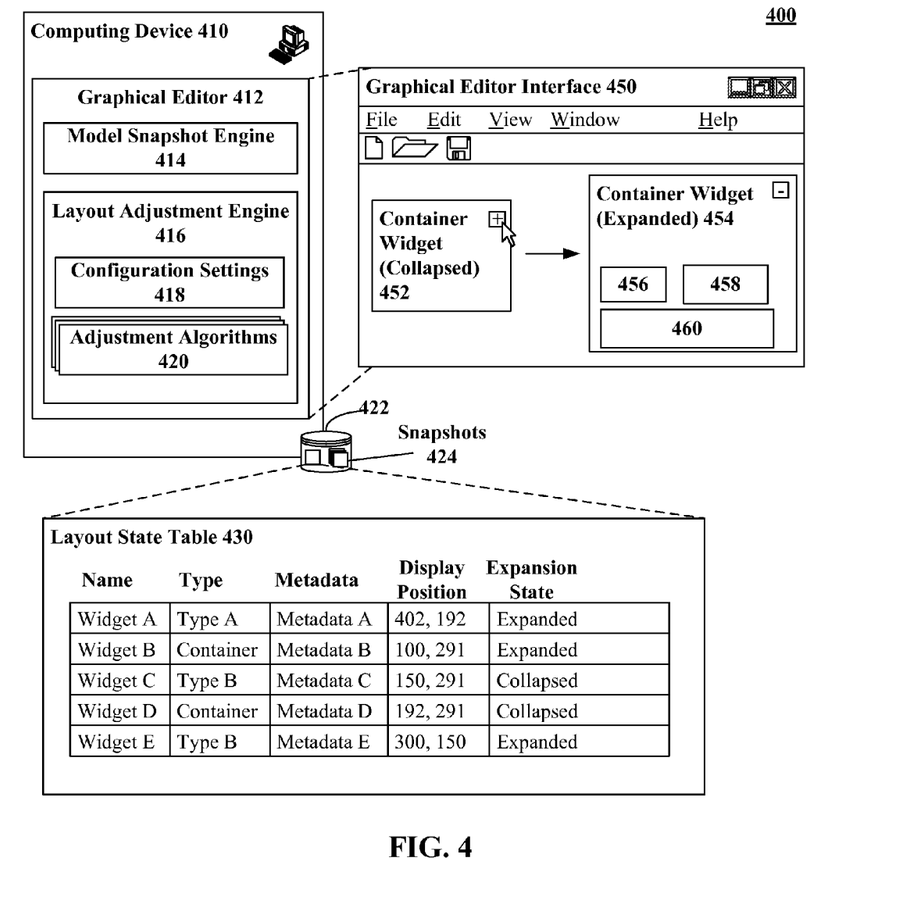
FIG. 4 is a schematic diagram of a system for automatically arranging widgets of a model within a canvas using iterative region based widget relative adjustments in accordance with an embodiment of the inventive arrangements disclosed herein.

FIG. 4 is a schematic diagram of a system 400 for automatically arranging widgets of a model within a canvas using iterative region based widget relative adjustments in accordance with an embodiment of the inventive arrangements disclosed herein. System 400 can include computing device 410, which can run graphical editor 412, which is enhanced to automatically arrange widgets in a model. Graphical editor interface 450 illustrates a sample interface which can be presented on computing device 410 by graphical editor 412.

Graphical editor 412 can contain layout adjustment engine 416, which can implement the automatic arrangement of widgets. Layout adjustment engine 416 can respond to adjustment events triggered in graphical editor 412. When a user interacts with graphical editor 412 and alters the state of a widget, adjustment events can be generated and conveyed to layout adjustment engine 416. Layout adjustment engine 416 can include configuration settings 418 and adjustment algorithms 420. Adjustment algorithms 420 can include a set of one or more algorithms to be executed when responding to different adjustment events. An adjustment algorithm 420 can exist for each possible adjustment event, including, but not limited to, adding a new widget, resizing a widget, collapsing or expanding a container widget, moving a widget, and the like. Configuration settings 418 can include a configurable set of options that can affect the automatic adjustment of widgets in the canvas. Configuration settings 418 can include any number of options, including, but not limited to, a horizontal shift direction, a vertical shift direction, thresholds for triggering an adjustment, and the like. Layout adjustment engine 416 can store state information on data store 422, as illustrated by layout state table 430. Layout adjustment engine 416 can also interface with model snapshot engine 414. Model snapshot engine 414 can save the state of a model at any given time as snapshots 424 on data store 422 for use by layout adjustment engine 416. When an adjustment is made to the model that returns the model to a previous state, layout adjustment engine 416 can retrieve the state from snapshots 424 rather than re-calculating changes to the layout state.

Computing device 410 can be any computing device capable of running graphical editor 412. Computing device 410 can be any computing device, including, but not limited to, a desktop computer, laptop computer, workstation, personal data assistant (PDA), mobile phone, and the like.

Graphical editor 412 can be a computing application which can allow a user to create models on a canvas. Using graphical editor 412, a user can adjust the model and the widgets it contains. The adjustments the user makes can trigger adjustment events, which can be sent to layout adjustment engine 416 for the automatic re-arrangement of the widgets contained in the model. In certain situations, it can be preferred to not automatically adjust certain aspects of the model. It is contemplated that graphical editor 412 can present an interface option for the user to specify certain widgets in the model as immune to automatic arrangement. Options such as these can be saved on data store 422 or in configuration settings 418. Graphical editor 412 can be any program which can allow the user to interact with a model via a canvas. Graphical editor 412 can allow the user to create diagrams (e.g., VISIO, DIA, etc.), user interface arrangements (e.g., GLADE, ECLIPSE, VISUAL STUDIO INTEGRATED DEVELOPMENT ENVIRONMENT, etc.), software module or arrangement and connections (e.g., GRAPHEDIT, etc.), and the like.

Model snapshot engine 414 can be a software engine which can allow "snapshots" to be taken of the current model layout. A snapshot can be a collection of data that describes the current layout of the model. Model snapshot engine 414 can store a plurality of snapshots 424 on data store 422. These snapshots 424 can act as a cache for different levels of the state of the model, therefore snapshots 424 can be viewed as a history of the model. When the state of the model is changed to a previous model state, a snapshot 424 of the state can be retrieved and applied to the model. It is contemplated that in some embodiments, model snapshot engine 414 and snapshots 424 can be omitted, although they can provide enhanced functionality for layout adjustment engine 416.

Layout adjustment engine 416 can be a software engine responsible for the automatic arrangement of widgets in the model in an attempt to remedy layout inconsistencies. Layout adjustment engine 416 can respond to the adjustment events captured by graphical editor 412 by automatically arranging the widgets using an adjustment algorithm 420 associated with the adjustment event. Adjustment algorithms 420 can iteratively adjust affected by an adjustment event. In some embodiments, a singular adjustment algorithm 420 can exist to handle any adjustment event. In other, more purpose-specific embodiments, an adjustment algorithm 420 can exist for each attainable adjustment event. Layout adjustment engine 416's behavior can be user configurable and its settings can be stored in configuration settings 418 or on data store 422. Layout adjustment engine 416 can use model snapshot engine 414 to cache layout states as their encountered and changed.

Layout adjustment engine 416 can store information about the current layout state on data store 422, as illustrated by layout state table 430.

Configuration settings 418 can include a set of user-configurable settings. These settings can include a threshold to use before triggering the auto arrangement of widgets for each adjustment events. For example, a user can specify to only automatically arrange widgets when a widget's size is changed by five pixels or greater. In another example, a user can specify to only automatically arrange widgets when a layout inconsistency has occurred.

Layout state table 430 can illustrate the storage of the model and its widgets and their current layout state. As shown layout state table 430 can include fields name, type metadata, display position, and expansion state. The name field can be used to store the name of the widget. The type field can be used to store the type of the widget. The metadata field can be used to store metadata associated with the widget for graphical editor 412. The metadata can be used by graphical editor 412 to only allow compatible relationships between widgets. The display position field can be used to store the current position of the widget. The expansion state field can be used to store the current state of the widget.

In an example based upon conventions discussed in FIG. 1, table 430 can represent a snapshot for a layout state having a key of Ae, Be, Cc, Dc, Ee, where A-E represent Widgets and "e" and "c" represent an expanded and collapsed state for each Widget.

Graphical Editor Interface 450 can illustrate an interface provided by graphical editor 412. Graphical editor interface 450 can contain container widget 452, which can be in the collapsed state. Graphical editor interface 450 illustrates container widget 452 changing from the collapsed state to an expanded state. Container widget 454 can be container widget 452 after it has expanded. After expansion, container widget 454 can expose the widgets it contains, widgets 456-460.

Data store 422 can be physically implemented within any type of hardware including, but not limited to, a magnetic disk, an optical disk, a semiconductor memory, a digitally encoded plastic memory, a holographic memory, or any other recording medium. The data store 422 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

The diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatically adjusting a layout of widgets in a canvas comprising:

detecting an event associated with collapsing a container widget, which is one of a plurality of widget adjustment events performed against a model, for a widget that is part of the model that is presented on a canvas of a user interface, wherein the widget adjustment event affects a layout positioning of the widget on the canvas;

adjusting on-canvas objects, which include other widgets, proximate to the widget, wherein adjustments of the on-canvas objects are performed relative to a layout position of the widget after the widget adjustment event has occurred;

adjusting additional on-canvas objects further from the widget than the adjusted on-canvas objects, wherein adjustments of the additional on-canvas objects are performed relative to layout positions of the adjusted on-canvas objects after the adjustments for their positioning relative to the widget have occurred, wherein the adjustments occur automatically responsive to detecting of the widget adjustment event;

before each of the plurality of widget adjustment events saving a snapshot of the layout of the model;

before adjusting any on-canvas objects, determining whether a post-adjustment state of the canvas after the detected widget adjustment event occurs corresponds to a previously saved snapshot; and when a previously saved snapshot corresponds to the post-adjustment state, retrieving the previously saved snapshot and adjusting a layout of on-canvas objects on the canvas in accordance with the retrieved snapshot, wherein a plurality of snapshots of the layout of the model are stored in a layout state table, said plurality of snapshots comprising said saved snapshot and said the previously saved snapshot, wherein each of the plurality of snapshots includes an entry for each of the plurality of widgets of the model and an expansion state of that widget specific to the corresponding snapshot.

2. The method of claim 1, wherein each of the on-canvas objects and the addition canvas objects are widgets, wherein labels, relationships, and other visual elements rendered on the canvas are adjusted in accordance with post adjustment widget positions.

3. The method of claim 1, wherein the widget adjustment event is a user triggered event occurring responsive to a user interaction with the user interface.

4. The method of claim 1, wherein the user interface is a graphical user interface of a graphical editor software application.

5. The method of claim 1, wherein an order and a nature of the adjustments of the on-canvas objects and of the additional on-canvas objects ensures that subsequent adjustments do not result in a need to re-adjust a layout position on the canvas of previously adjusted on-canvas objects.

6. A graphic editor stored in a non-transitory storage medium comprising:

a layout adjustment engine configured to automatically adjust widgets visually presented on a canvas relative to a layout position of a reference widget presented on the canvas responsive to a widget adjustment event that causes the layout positioning of the reference widget on the canvas to change, wherein automatic adjustments performed by the layout adjustment engine occur local to the reference widget first, and then expand outwards to affect layout positions on the canvas of other widgets, wherein the other widgets are adjusted based upon new positions of widgets, which were already adjusted responsive to the widget adjustment event, wherein the widget adjustment event results in the reference widget occupying a smaller area than it previously did on the canvas, wherein the automatic adjustments performed by the layout adjustment engine affect the other widgets by moving the other widgets closer to the reference widget; and a non-transitory storage medium referred to as a layout state table, which saves a plurality of different snapshots of layouts of the widgets on the canvas, wherein each of the plurality of snapshots saves an entry for each of the plurality of widgets of the model and saves an expansion state of that widget specific to the corresponding snapshot, wherein expansion state for each widget indicates whether the corresponding widget is expanded or collapsed on the canvas.

7. The graphic editor of claim 6, further comprising:

a model snapshot engine configured to save and situationally restore layout positions of models rendered on canvases responsive to widget adjustment events, wherein the model snapshot engine only restores layout positions when a previously saved snapshot represents a layout desired after the widget adjustment event is applied to the canvas, which is determined by the layout adjustment engine.

8. A computer program product for automatically adjusting a layout of widgets in a canvas comprising a non-transitory computer usable medium having computer usable program code embodied therewith, the computer usable program code comprising:

computer usable program code, stored in the non-transitory computer usable medium and executable by at least one processor, to detect an event associated with collapsing a container widget contained on the canvas, wherein the widget adjustment event affects a layout positioning of the widget on the canvas by reducing an area consumed by the widget on the canvas to a sub-area of what that widget originally consumed;

computer usable program code, stored in the non-transitory computer usable medium and executable by at least one processor, to adjust on-canvas objects, which include other widgets, proximate to the widget, wherein adjustments of the on-canvas objects are performed relative to a layout position of the widget after the widget adjustment event has occurred; and computer usable program code, stored in the non-transitory computer usable medium and executable by at least one processor, to adjust additional on-canvas objects further from the widget than the adjusted on-canvas objects, wherein adjustments of the additional on-canvas objects are performed relative to layout positions of the adjusted on-canvas objects after the adjustments for their positioning relative to the widget have occurred, wherein the adjustments occur automatically responsive to detecting of the widget adjustment event, wherein each of the on-canvas objects and the addition canvas objects are widgets, wherein labels, relationships, and other visual elements rendered on the canvas are adjusted in accordance with post adjustment widget positions, wherein a plurality of snapshots of the layout of the model are stored in the non-transitory computer usable medium as a layout state table, said plurality of snapshots comprising said saved snapshot and said the previously saved snapshot, wherein each of the plurality of snapshots includes an entry for each of the plurality of widgets of the model and an expansion state of that widget specific to the corresponding snapshot.

9. The computer program product of claim 8, wherein the widget adjustment event is a user triggered event occurring responsive to a user interaction with the user interface, wherein said computer program product supports a plurality of different widget adjustment events, wherein said plurality of different widget adjustment events comprise:

a widget adjustment event for an event associated with expanding a container widget contained on the canvas;

a widget adjustment event for an event associated with collapsing a container widget contained on the canvas;

a widget adjustment event for an event associated with resizing of a widget contained on the canvas; and a widget adjustment event for an event associated with adding a new widget to the canvas.

10. The computer program product of claim 8, wherein the widget adjustment event is a user triggered event occurring responsive to a user interaction with the user interface.

11. The computer program product of claim 8, wherein the user interface is a graphical user interface of a graphical editor software application.

12. The computer program product of claim 8, wherein an order and a nature of the adjustments of the on-canvas objects and of the additional on-canvas objects ensures that subsequent adjustments do not result in a need to re-adjust a layout position on the canvas of previously adjusted on-canvas objects.

13. The computer program product of claim 8, wherein the widget adjustment event is one of a plurality of widget adjustment events performed against the model, said method further comprising:

computer usable program code, stored in the non-transitory computer usable medium and executable by at least one processor, to, before each of the plurality of widget adjustment events, save a snapshot of the layout of the model;

computer usable program code, stored in the non-transitory computer usable medium and executable by at least one processor, to, before adjusting any on-canvas objects, determine whether a post-adjustment state of the canvas after the detected widget adjustment event occurs corresponds to a previously saved snapshot; and computer usable program code, stored in the non-transitory computer usable medium and executable by at least one processor, to, when a previously saved snapshot corresponds to the post-adjustment state, retrieves the previously saved snapshot and adjusting a layout of on-canvas objects on the canvas in accordance with the retrieved snapshot.

14. The graphic editor of claim 6, wherein said layout adjustment engine is configured to respond to a plurality of different widget adjustment events including:

a widget adjustment event for an event associated with expanding a container widget contained on the canvas;

a widget adjustment event for an event associated with collapsing a container widget contained on the canvas;

a widget adjustment event for an event associated with resizing of a widget contained on the canvas; and a widget adjustment event for an event associated with adding a new widget to the canvas.

15. The method of claim 1, wherein the snapshot is saved in a layout table, wherein the previously saved snapshot is retrieved from the layout table, wherein the layout table is not a Last In First Out (LIFO) stack.

16. The method of claim 1, wherein a plurality of different snapshots are persisted, one for each layout of the model, wherein the plurality of snapshots that are persists comprises N to the second power, wherein N is the number of widgets on the canvas, wherein a snapshot is persisted for each unique combination of collapsed and expanded widgets for the N widgets.

17. The graphic editor of claim 6, wherein the widget adjustment event results in an area of the canvas occupied by the reference widget to become smaller and to be a sub-portion of an area of the canvas the reference widget consumed prior to the widget adjustment event.

* * * * *